April 14, 1959     A. P. CHARBONNEAU     2,882,376
ELECTRIC HEATING UNITS AND METHODS OF MAKING THE SAME
Filed Aug. 10, 1955     2 Sheets-Sheet 1
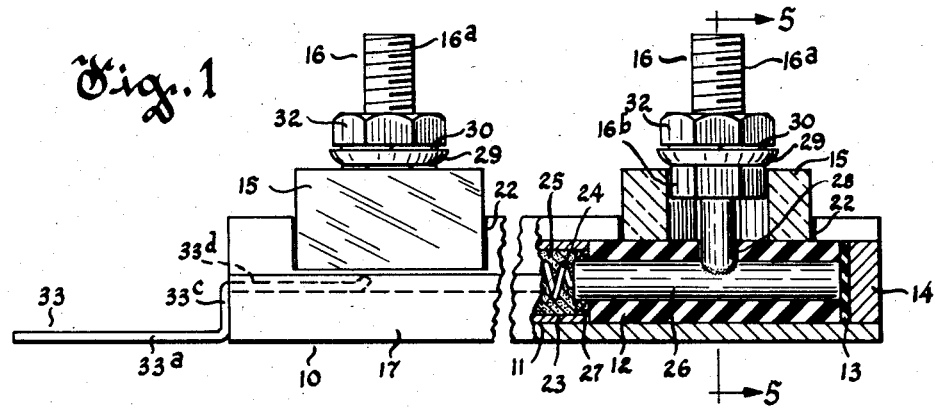
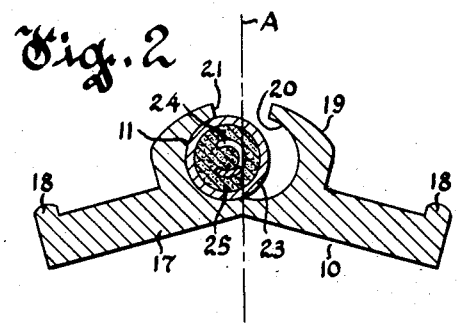
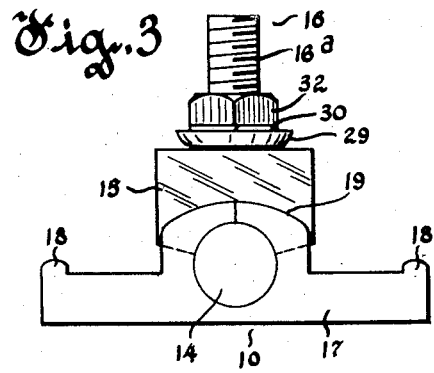
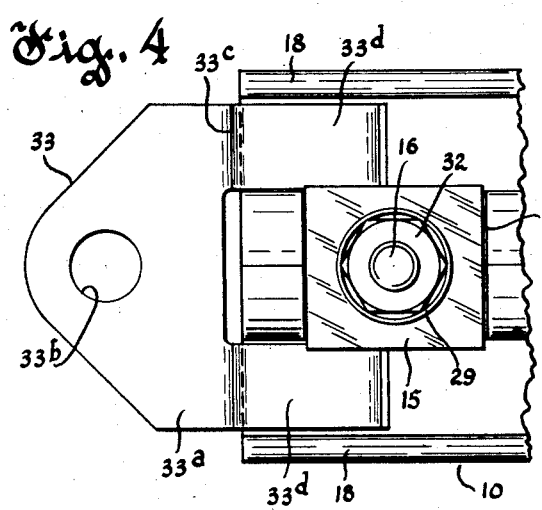
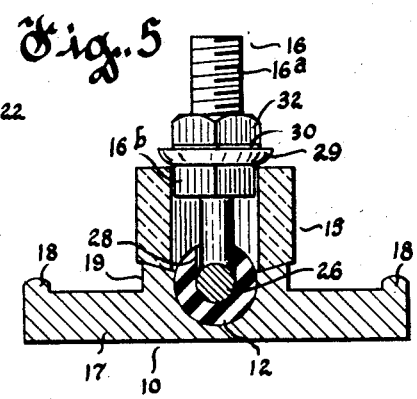
Inventor
Allan P. Charbonneau
By H. R. Ratter
Attorney April 14, 1959 A. P. CHARBONNEAU 2,882,376
ELECTRIC HEATING UNITS AND METHODS OF MAKING THE SAME
Filed Aug. 10, 1955 2 Sheets-Sheet 2
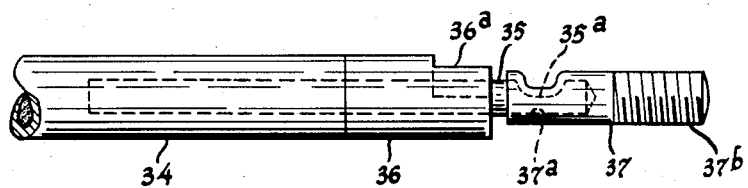
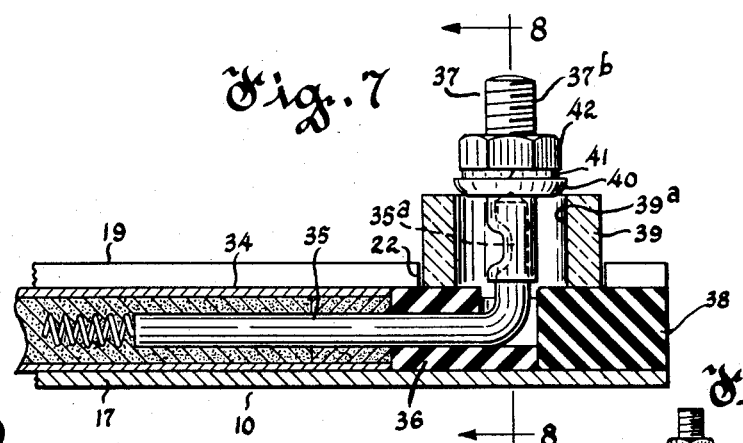
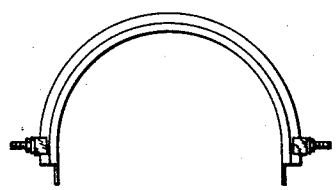
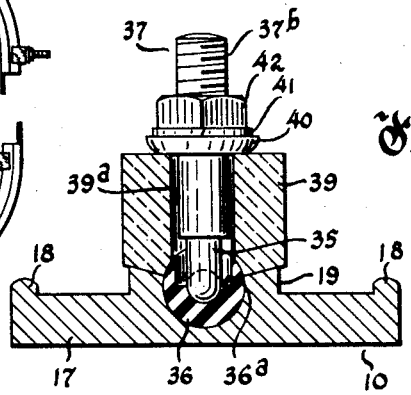
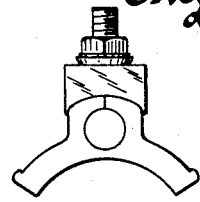
Inventor
Allan P. Charbonneau
By H. R. Rather
Attorney United States Patent Office 2,882,376
Patented Apr. 14, 1959

2,882,376

ELECTRIC HEATING UNITS AND METHODS OF MAKING THE SAME

Allan P. Charbonneau, Wauwatosa, Wis., assignor to Cutler-Hammer, Inc., Milwaukee, Wis., a corporation of Delaware Application August 10, 1955, Serial No. 527,559

8 Claims. (Cl. 201—67)

This invention relates to electric heating units and methods of making the same.

The use of tubular sheathed electric heating elements for heating surfaces by conduction is of course well known. Tubular heaters of circular cross section are not well adapted for such use because they afford line contact only. It is common practice to increase the area of contact by flattening a section of the tube wall. Other expedients have been used to increase the heat transfer area of such heaters, such as by welding plates thereto, or by embedding them in grooves and casting relatively high heat conducting metals around the heaters. The latter of such expedients has proved the most effective in respect of providing increased area of contact in combination with good heat transfer characteristics, but the complications and costs of manufacture leave considerable to be desired.

Strip type electric heaters, which are also well known, provide wide flat areas for clamping against surfaces to be heated, but as compared with tubular heaters have inferior insulation and poor internal heat conductivity.

It is a primary object of the present invention to provide an improved electric heating unit that combines the desirable characteristic of tubular heaters with the wide flat areas afforded by strip heaters, and Another object is to provide a heating unit of the aforementioned type which can be readily constructed without the problems associated with casting metal bodies about tubular heaters.

Other objects and advantages of the invention will hereinafter appear.

In carrying out these objects, I provide a preformed shell or base member of a high heat conducting metal and of a relatively heavy cross section to provide a good path for heat transfer. Preferably I choose to have such base formed by extrusion methods in long lengths and with cross sectional dimensions and surface finish that require no further preparation. Then standard lengths, corresponding to the lengths of the finished heater units, are then cut from these extruded lengths. The cross section of the base preforms are provided with a channel portion having substantially C-shaped longitudinal recesses or grooves within which a standard type of tubular heater may be readily placed. After emplacement of a heater of appropriate length within the groove, the walls of the channel portion surrounding the tubular heater are formed to close along the length of the base member and tightly engage in intimate contact about the periphery of the outer wall of the tubular heater. The portion of the base to be clamped against a surface for heat transfer thereto is so designed and extruded in preform state that following, and as an incident to, closure of the walls of the channel portion about the heater, it assumes a shape providing a wide surface suitable for clamping against a surface to which it is to conform. Various forms of terminal ends for attachment of electrical conductors thereto are provided.

The accompanying drawings illustrate certain preferred embodiments of the invention which will now be described in detail, it being understood that the embodiments illustrated are susceptible of modification in respect of details without departing from the scope of the appended claims.

In the drawings:

Figure 1 is an elevational view, partially in section, of an improved electric conduction heating unit constructed in accordance with the invention.

Fig. 2 is a view in transverse cross section of the heater in an intermediate stage of assembly.

Fig. 3 is an end view of the heater.

Fig. 4 is a top plan view of an end portion of the heater.

Fig. 5 is a sectional view of the heater taken along the line 5—5 of Figure 1.

Fig. 6 is an elevational view of a sub-assembly used in constructing a modified form of heater.

Fig. 7 is a view in longitudinal section of the modified form of heater.

Fig. 8 is a sectional view taken along the line 8—8 of Figure 7.

Fig. 9 is an elevational view to reduced scale of a second modified form of heater.

Fig. 10 is a view like Fig. 9 of a third modified form of heater.

Fig. 11 is an end view of a fourth modified form of heater, and

Fig. 12 is an end view of a fifth modified form of heater.

As depicted in Figures 1 to 5, one preferred form of the improved heater comprises a base member 10, a sheathed tubular electric heater 11, tubular insulators 12, mica discs 13, bonded mica end plugs 14, insulator blocks 15, and threaded terminal studs 16. Base member 10 is preferably cut to desired length from a long length of an aluminum or an aluminum alloy extrusion, which in pre-assembled form has a transverse cross sectional configuration like that shown in Figure 2. More particularly, member 10 has a body portion 17, which in final assembled form of the heater is of substantially flat rectangular form, a longitudinally extending channel 19, which in preassembled form of the heater has a substantially C-shaped recess 20 which communicates with the outer surface of the channel through an opening 21. Heating element 11, which preferably is cut to the required length from a readily available commercial type of tubular sheathed heater comprises a metallic sheath 23, a helical resistor 24, compacted insulating material 25, terminal leads 26 to which the ends of resistor 24 are attached interiorly of the sheath 23, and end seals 27 for sheath 23.

As an initial step in the assembly of the heating unit, the tubular insulators 12, which each have a transverse opening 28 connecting with their outer surface with the bore thereof approximately midway between its ends, are slipped over each of the terminal leads 26 of heating element 11. Then the terminal studs 16 are inserted through the openings 28 and welded to the terminal leads 26 in any preferred manner. The sub-assembly thus obtained is then inserted longitudinally through the recess 20 and opening 21 of the base member preform channel 19 and is positioned so that the ends of terminal leads 26 are equidistant from the ends of recess 20, and the terminal studs 16 are positioned centrally of transverse slots 22 milled in channel 19.

Mica discs 13 are then inserted into the recess 20 in abutting engagement with the ends of the terminal leads 26 and the insulators 12, and the bonded mica plugs 14 are thereafter placed in recess 20 in abutting engagement with the discs 13.

As the next step in assembling the heater, the side walls of channel 19 over the entire length thereof are squeezed towards each other to bring the opposed ends of the side walls of the channel into mating engagement and the inner wall of said channel in intimate clamping engagement with the sheath of heating element 11, the discs 13, and the plugs 14. Preferably, the latter operation is carried out in a suitable press-break wherein pressure is applied downwardly against the upper ends of the channel portion walls uniformly therealong while the lower surface of base portion 17 abuts against a flat, non-yielding surface. With pressure so applied the channel portion walls and body portion 17 will bend about a center line, depicted by the broken line A in Fig. 2, and assume the final cross sectional form depicted in Fig. 3. The final steps in the assembly comprise placing the insulating blocks 15 over the terminal studs 16 and into seating engagement with the insulators 12 in the slots 22, placing the washers 29 and lock washers 30 over the threaded portions 16ᵃ of the studs 16 to seat against hexagonal portions 16ᵇ of the latter, and then taking down nuts 32 on the portions 16ᵃ.

In final assembled form the member 10 will have a substantially flat rectangular lower surface which makes it readily adaptable to mounting in abutting conducting relation to a flat surface of a body to be heated. Mounting clips 33, of the form depicted in Figs. 1 and 4, may be used to clamp and hold the heater against such a surface. The clips 33 comprise the portion 33ᵃ which are adapted to bear against a surface to which the heater is to be mounted and have openings 33ᵇ through which securing fasteners can penetrate. They further comprise intermediate right-angle portions 33ᶜ connecting the portions 33ᵃ with bifurcated portions 33ᵈ which straddle the channel 19 and bear against the upper surface between the edge ribs 18 and channel 19. Normally two such clips 33 are required to clamp the heater against a surface and hold the same against lateral movement thereon.

Figs. 6, 7 and 8 disclose a modified form of the heater hereinbefore described. In this modified form a tubular sheathed electric heater 34 is provided with terminal leads 35 at each end which have notches 35ᵃ formed therein adjacent their free ends. Tubular insulators 36 having cut-away recesses 36ᵃ formed therein are inserted over each lead and then threaded terminal studs 37 having axial recesses 37ᵃ extending inwardly from their unthreaded ends, are inserted over the ends of the leads 35 and secured to the latter by crimping the area adjacent such unthreaded ends against the leads 37 with a portion of the crimped area of the stud interlocking with the notches 35ᵃ of the leads 35. Then both of the leads 35, within the recesses 36ᵃ of the insulators 36, are bent at right angles as depicted in Fig. 7, to extend parallel and in a common plane. The subassembly thus effected is then inserted into base member 10 as aforedescribed in connection with Figs. 1 to 5, and bonded mica plugs 38 inserted into the ends of the recesses in channel 19. Then the channel 19 is closed about the sheath of heating element 34, the insulators 36, and plugs 38, as hereinbefore described. Insulator blocks 39, having substantially oval shaped openings 39ᵃ extending therethrough, are placed over each of the studs to seat within the notches 22 in member 10 against the channel 19, the insulators 36 and end plugs 38. The assembly is completed by placing washers 40 and lock washers 41 over each terminal stud 37, and taking down nuts 42 on the threaded portions 37ᵇ against the lock washers 41.

Each of the forms of heaters hereinbefore described are suitable for mounting against flat surfaces, or suspending for circulation of air thereabouts. However, the heaters can be curvilinearly formed lengthwise of member 10, so that the flat lower surface of the body members takes either the convexly arcuate form, as depicted in Fig. 9, or the concavely arcuate form, as depicted in Fig. 10. If the preassembled forms of the base members are suitably designed, the transverse cross sectional formation of the base members in completed state of the heaters can be such that the contacting surface of the body members will be either convexly curved, as depicted in Fig. 11, or concavely curved as depicted in Fig. 12. Thus it will be seen that conduction heaters of the aforementioned type can be adapted to a wide variety of conduction heating applications.

I claim:

1. The method of making an electric heating unit which comprises the steps of providing a base member preform formed of a high heat conducting metal and comprising an open channel portion having a C-shaped recess and an integral main body portion which has appreciable lateral extension beyond both sides of said channel portion, then inserting into said recess a tubular electric heater having a metallic sheath and a resistance element supported within said sheath, and then simultaneously closing the walls of said channel portion peripherally about said sheath and bending said body portion to frictionally secure said heater in place with the outer wall of its sheath in intimate heat conducting engagement with the inner surfaces of the walls of said channel portion throughout its length and about its entire periphery and to provide said body portion with a surface of a form suitable to engage throughout its extent in good heat conducting relation with a complementally formed surface of a body to be heated.

2. The method according to claim 1 wherein said base member preform is cut to desired length from a long continuous extruded piece having the channel portion, C-shaped recess and main body portion specified.

3. The method according to claim 1 wherein the closing of the walls of said channel portion and the bending of the main body portion is obtained by applying pressure downwardly along the length of said channel portion with said surface of the body portion abutting against a non-yielding surface.

4. In an electric heating unit, in combination, a tubular sheathed electric heating element comprising a helical coil resistor supported in insulating material within the bore of the sheath and terminal leads which extend beyond the ends of the sheath, a base member formed of a good heat conducting metal and comprising a main body portion and an integral closed channel portion which extends beyond a surface of said body portion and which is co-extensive with the latter along its longitudinal dimension, said channel portion having a longitudinal bore within which said heating element is frictionally secured along the length and about the entire periphery of its sheath in intimate conducting relation with the inner surface of said channel portion, and having openings therein adjacent its opposite ends, and terminal extensions secured to the terminal leads of said heating element and projecting through said openings outwardly beyond said channel portion.

5. The combination according to claim 4 together with electrical insulators disposed about portions of said terminal leads lying within said channel portion, and end plugs frictionally secured in place in the ends of the bore of said closed channel portion.

6. The combination according to claim 5 wherein said terminal extensions are welded on to said terminal leads and extend at right angles therefrom through clearance openings in said electrical insulators and through said openings in said closed channel portion, and wherein electrical insulating blocks are disposed about said terminal extensions and seat within the last mentioned openings against said insulators and said channel portion and means secured to said terminal extension and overlying the outer ends of said blocks secure the latter in place.

7. The combination according to claim 5 wherein outer end portions of said terminal leads extend at right angles through said openings in said channel portion and said terminal extensions are frictionally concentrically secured by crimping on said outer end portions of said terminal leads, and wherein electrical insulating blocks are disposed about said terminal extensions and said outer end portions of said terminal leads and seat against said insulators and said channel portion and means secured to said terminal extension and overlying the outer ends of said blocks secure the latter in place.

8. As an electric heating unit, in combination, an electric tubular sheathed heater having a resistance element insulatingly supported within a metallic sheath, and a base member formed of a high heat conducting metal and adapted to be secured mechanically to a body to be heated, said base member comprising a channel portion whose walls close entirely about the periphery of the outer wall of said sheath throughout its length in intimate heat conducting engagement to secure said heater therewithin by friction and further comprising an integral body portion that extends laterally an appreciable extent beyond both sides of said channel portion, said integral body portion having a surface of a form suitable to engage throughout its extent with a complementally formed surface of the said body to be heated.

References Cited in the file of this patent

UNITED STATES PATENTS

| | | |
|---|---|---|
| 1,313,730 | Pease | Aug. 19, 1919 |
| 1,359,400 | Lightfoot | Nov. 16, 1920 |
| 1,540,221 | Nowosielski | June 2, 1925 |
| 1,699,898 | Lightfoot | Jan. 22, 1929 |
| 1,757,142 | Renner | May 6, 1930 |
| 2,182,968 | Lunsford | Dec. 12, 1939 |
| 2,190,288 | Higham | Feb. 13, 1940 |
| 2,389,587 | Appleman | Nov. 27, 1945 |
| 2,489,998 | Charbonneau et al. | Nov. 29, 1949 |
| 2,576,537 | Rogoff | Nov. 27, 1951 |
| 2,584,717 | Alpert et al. | Feb. 5, 1952 |
| 2,586,011 | Doelter | Feb. 19, 1952 |
| 2,684,428 | Bixler | July 20, 1954 |
| 2,786,125 | Drugmand et al. | Mar. 19, 1957 |

FOREIGN PATENTS

| | | |
|---|---|---|
| 720,939 | Great Britain | Dec. 29, 1954 |

OTHER REFERENCES

Modern Metals, January 1950, vol. 5, page 17.